United States Patent
Yodis

[11] 3,763,019
[45] Oct. 2, 1973

[54] PROCESS FOR DEHYDRATING ACID HALIDE AZEOTROPES WITH LITHIUM SALTS

[75] Inventor: Anthony W. Yodis, Camillus, N.Y.
[73] Assignee: Allied Chemical Corporation, New York, N.Y.
[22] Filed: Apr. 21, 1971
[21] Appl. No.: 135,974

[52] U.S. Cl.................. 203/12, 423/488, 423/481, 159/47, 23/307
[51] Int. Cl............................................ B01d 3/34
[58] Field of Search........................ 423/488, 481; 203/12, 29; 159/DIG. 19, 47; 23/307

[56] References Cited
UNITED STATES PATENTS

| | | | |
|---|---|---|---|
| 1,906,467 | 5/1933 | Heath | 203/29 X |
| 2,428,524 | 10/1947 | Matuszak | 203/12 X |
| 2,764,532 | 9/1956 | Rauh | 203/12 X |
| 2,357,095 | 8/1944 | Evans et al. | 203/12 |

Primary Examiner—Norman Yudkoff
Assistant Examiner—David Edwards
Attorney—Gerard P. Rooney and Clayton F. Smith

[57] ABSTRACT

A process for dehydrating an aqueous solution of hydrochloric, hydrobromic or hydriodic acid having an initial concentration approximating its respective azeotrope, by mixing said solution with the lithium salt of the corresponding acid, stripping off anhydrous hydrogen halide and concentrating and recycling the residual lithium salt back to the mixing step.

14 Claims, 5 Drawing Figures

INVENTOR.
ANTHONY W. YODIS

LiCl - HCl - H$_2$O SOLUTIONS IN EQUILIBRIUM
WITH 10-80 % HCl VAPOR

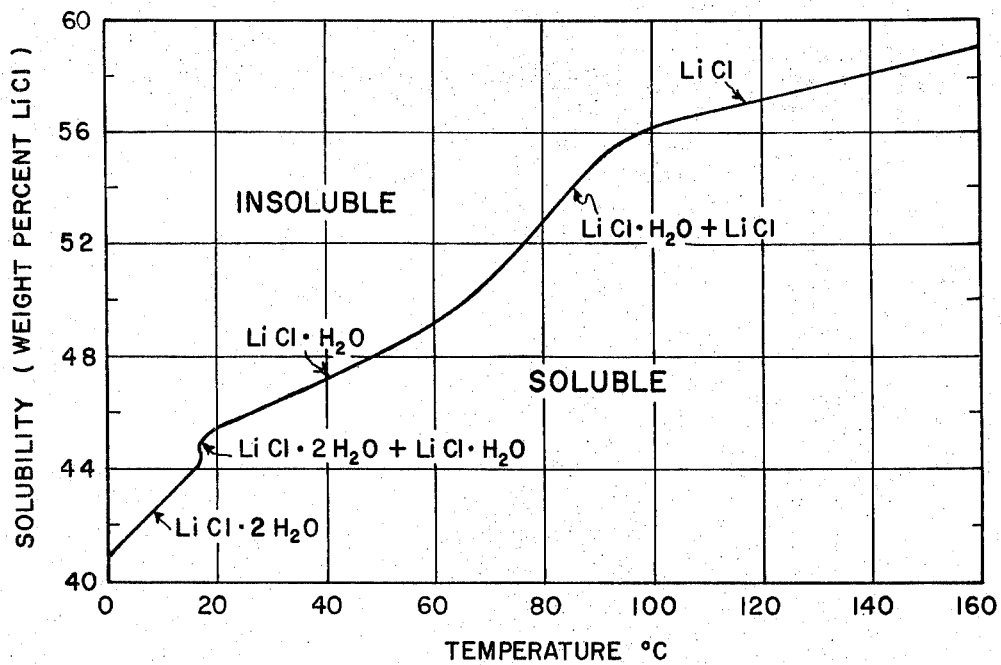
FIG. 4   SOLUBILITY OF LiCl IN H₂O
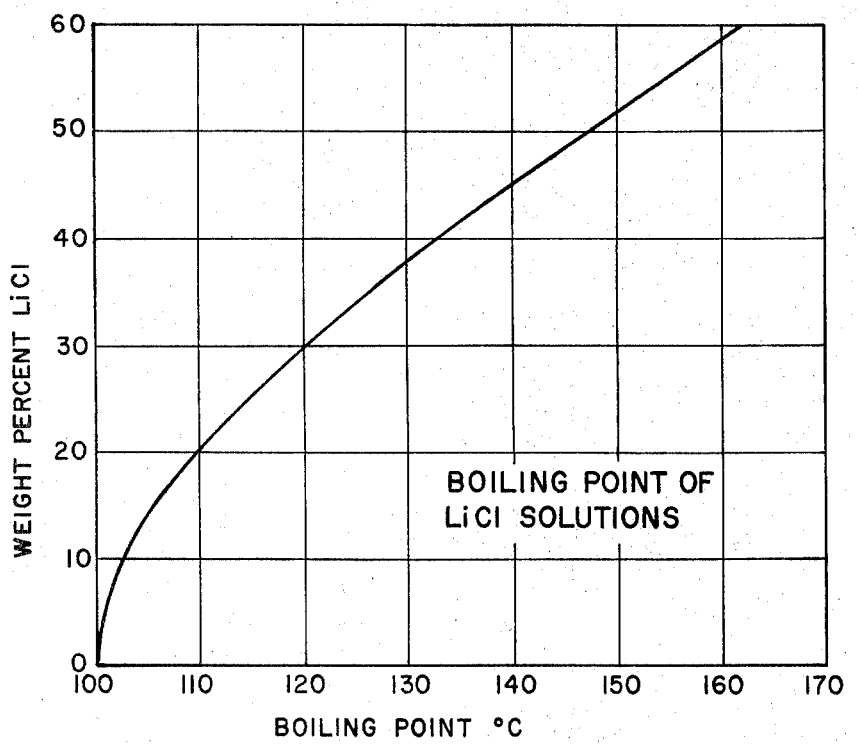
FIG. 5

PROCESS FOR DEHYDRATING ACID HALIDE AZEOTROPES WITH LITHIUM SALTS

BACKGROUND OF THE INVENTION

This invention relates to a process for the production of essentially anhydrous hydrogen chloride from aqueous solutions of hydrochloric acid having a concentration of at least about 20 percent. The invention is applicable to more dilute solutions of the acid, if they are first concentrated to about 20 percent by conventional means. Such preliminary concentration is readily accomplished since on heating aqueous solutions of HCl of less than 20 percent concentration, water plus very small amounts of HCl are driven off until a constant boiling solution, the hydrochloric acid azeotrope, is obtained. This azeotrope has a concentration of 20.24 percent HCl and a boiling point of 109° C. at 760 mm Hg.

The invention is also applicable to aqueous solutions of hydrochloric acid having concentrations ranging from that of the azeotrope up to about 43.4 percent, which is the maximum possible concentration for an aqueous solution of hydrogen chloride under standard conditions of temperature and pressure. These solutions will, on being heated, give off mainly hydrogen chloride until the concentration of the solution drops to that of the constant boiling azeotrope. The evolved hydrogen chloride, however, will also contain water vapor, and if the water vapor in the gas stream is condensed, it will entrain a portion of the hydrogen chloride with it, forming concentrated aqueous hydrochloric acid. The smaller the amount by which the concentration of the acid solution being heated exceeds that of the azeotrope, the smaller the yield of anhydrous hydrogen chloride that will be evolved, and the greater the amount of concentrated hydrochloric acid that will result.

By the application of the process of the present invention, substantially all of the hydrogen in a 20-43 percent solution is evolved and can be recovered as an anhydrous gas with no appreciable formation of concentrated hydrochloric acid.

The present invention is also directed to related processes for obtaining essentially anhydrous hydriodic acid and hydrobromic acid from their respective aqueous solutions.

Many users of substantially anhydrous hydrochloric acid have available, either as a by-product of their own operations or by economic purchase, substantial quantities of hydrochloric acid ranging in strength from about 10 percent up to the usual commercial strength of about 36 percent hydrochloric acid. Not only is anhydrous HCl becoming increasingly important in the chemical industry, but the quantity of aqueous hydrochloric acid available for its production is also rapidly growing, as it is the by-product from many chlorination reactions. A practical method for economically dehydrating aqueous hydrochloric acid to obtain substantially anhydrous hydrogen chloride is therefore highly desirable.

DESCRIPTION OF THE PRIOR ART

Prior processes for making anhydrous HCl are characterized in general by the treatment of aqueous hydrochloric acid with concentrated sulfuric acid, calcium chloride or similar dehydrating agents. Such methods possess two outstanding disadvantages; namely (1), the necessity for employing relatively cumbersome contacting towers and (2), the necessity for employing methods of operation which lead to the production of large quantities of dilute or spent dehydrating agents requiring reconcentration, reactivation or fortification. Probably the bulk of the anhydrous hydrochloric acid presently produced from aqueous hydrochloric acid is made by stripping out the water content thereof by means of tower operations in which 93–98 percent sulfuric acid is employed as the dehydrating agent. In such operations the by-product sulfuric acid is substantially below commercially desirable strengths, with the result that reconcentration of large volumes of relatively weak sulfuric acid becomes necessary.

Another disadvantage of the prior art processes is that they frequently provide a product containing 1 to 2 percent moisture. If not dried further by additional processing steps, the moist hydrogen chloride creates handling problems, requires special corrosion resistant equipment and may adversely affect the subsequent reaction of the hydrogen chloride with various other reactants.

British Pat. specification No. 669,671 recognizes the importance of a really dry product, and discloses a method wherein it is claimed substantially anhydrous HCl can be produced. A special design of packed column is employed wherein the HCl solution contacts a hot hygroscopic salt solution. The use of the column contributes to the dryness of the product hydrogen chloride, but the essential characteristic of the apparatus used is the condensing system, a refrigerated condenser being required to produce HCl having the desired degree of dryness.

This British patent claims the use of hot concentrated hygroscopic salt solutions which may be 30–60 percent aqueous solutions of calcium chloride, lithium chloride, magnesium chloride or ferric chloride. The use of calcium chloride is particularly emphasized, being the subject of a separate claim, and being the only "hygroscopic salt" on which the examples are based. The hydrogen chloride gas is said to be "evolved from the constant boiling mixture by a 'salting out' effect." This would imply that it is the presence of the chloride ion rather than of the cation that brings about the separation of the hydrogen chloride.

This British specification equates lithium chloride solution with solutions of the chlorides of calcium, magnesium and iron which is an interesting point, because actually, I have found that the action of the solid lithium salt utilized in the present invention functions in a manner entirely different from that of any of the other dehydrating agents. All other known dehydrating agents bind water by forming hydrates. Because of the manner in which these substances function, one would not expect that lithium chloride could be used effectively for dehydration, for it loses the last of its water of hydration at the comparatively low temperature of about 98° C. Surprisingly, I have found LiCl does not bind water by forming hydrates, because it can exert its dehydrating action at much higher temperatures. I believe that dehydration is accomplished by lithium chloride, not by hydrate formation, but rather by hydration of the lithium ion itself, when in solution.

The disadvantages of the prior art method as exemplified by British Pat. specification No. 669,671, just discussed, include the need for costly corrosion resistant equipment such as an especially designed packed column, and an elaborate condensing system including a refrigerated unit, when production of anhydrous hydrogen chloride is required.

It has now been found that the dryness of the hydrogen chloride evolved from a mixture of hydrochloric acid and lithium chloride, and the initial yield therefrom is related to the concentration of the lithium chloride. Accordingly, it has been found that an exceptionally dry product can be obtained by employing the lithium chloride either as the anhydrous salt or a solid hydrate such as the monohydrate, rather than as an aqueous solution as taught by the prior art. It has also been found that effective stripping of hydrogen chloride from the hydrogen chloride/lithium chloride mixture may be accomplished at comparatively low temperatures, and that the evolved hydrogen chloride can be rendered essentially anhydrous without the use of refrigeration. When utilizing our process, cooling the evolved hydrogen chloride gas to about 27° C. or below will remove any remaining moisture in the form of a small amount of concentrated hydrochloric acid, and produce hydrogen chloride containing less than 0.3 percent water. Finally, it has been found that a comparatively simple process may be employed, either batchwise or preferably continuously, in which the spent lithium chloride is reconcentrated to a solid and recycled to the generator containing the essentially azeotropic solution of hydrogen chloride from which the dry hydrogen chloride is evolved.

While the above discussion has been directed to hydrogen chloride and lithium chloride, it should be realized that as heretofore indicated, the same technique and apparatus is applicable to hydrogen bromide and hydrogen iodide, in combination with their respective lithium bromide and lithium iodide salts.

SUMMARY OF THE INVENTION

The process of the present invention for dehydrating aqueous solutions of hydrochloric, hydrobromic or hydriodic acid to obtain the corresponding hydrogen halide, comprises the steps of:

1. mixing the halogen acid solution with the solid anhydrous or hydrated lithium salt of the halogen acid being treated,
2. stripping the halogen halide from the mixture by maintaining the mixture at a temperature of between about 20° to 130° C. to afford hydrogen halide vapor and a residual lithium salt solution,
3. cooling the halogen halide vapor, thereby separating condensibles present therein,
4. separating essentially anhydrous hydrogen halide from said condensibles,
5. concentrating said residual lithium salt solution to the solid state, and
6. recycling said solid lithium salt to the aforesaid mixing step.

This process is of value as the means of simply and economically converting azeotropic or stronger solutions of hydrobromic, hydrochloric or hydriodic acids to the anhydrous halogen halides, without the need for supplemental drying steps. The process is applicable to these hydrogen halide acids having strengths ranging from the concentration of their respective azeotropes up to the maximum concentration obtainable in each case, in aqueous solution under standard conditions of temperature and pressure.

BRIEF DESCRIPTION OF THE DRAWINGS

FIG. 4 of the drawings presents a solubility curve for lithium chloride in water. This curve is not smooth, but is responsive to the hydrates of lithium chloride as it passes through the temperature ranges wherein these hydrates exist.

FIG. 5 traces the boiling point curve for an aqueous solution of lithium chloride at atmospheric pressure as the concentration by weight percent, of LiCl therein, varies from 0 to 60. Referring to FIG. 1:

Figure 1:
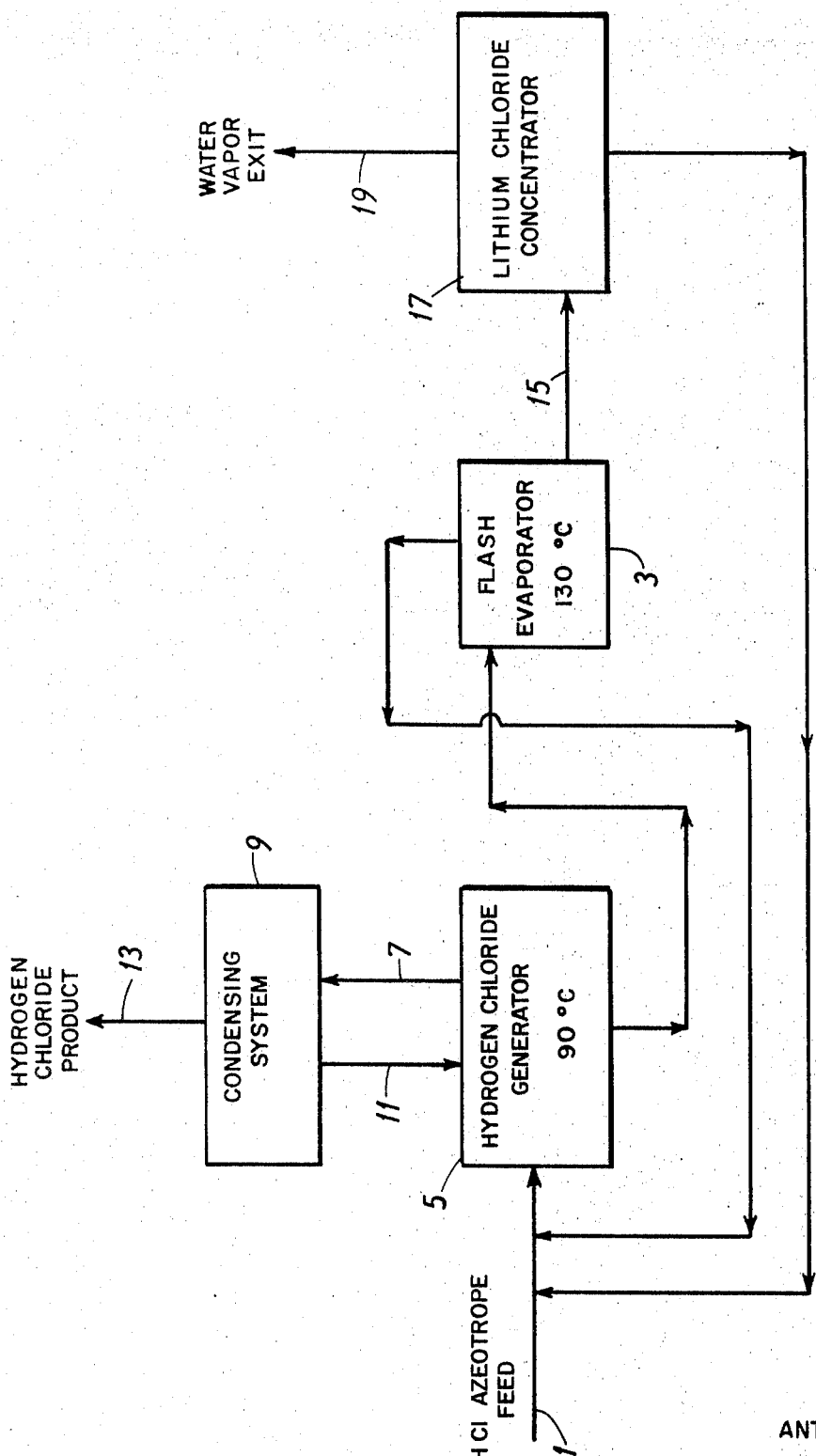
FIG. 1 of the drawings is a flow diagram of the novel process of the instant invention, which can be operated batchwise, but preferably, is operated continuously.

Reference No. 1 denotes the feed line through which hydrochloric acid having a concentration of at least 20 percent is fed into generator 5 as raw material, and mixed with solid lithium chloride from lithium chloride concentrator 17, and a small amount of HCl flashed from the spent lithium chloride in flash evaporator 3. The charge is mixed and heated in generator 5. Liberated hydrogen chloride leaves the generator through riser 7, and enters condensing system 9. Any condensate returns to generator 5 through return line 11, and the anhydrous HCl product leaves through line 13. The residual lithium chloride in generator 5 is directed to flash evaporator 3, wherein any trace of HCl remaining therein is flashed off and returned to feed line 1, while the HCl-free lithium chloride is transferred to lithium chloride concentrator 17. Here the lithium chloride is concentrated to the anhydrous or the hydrated solid salt which is then recycled to the HCl generator 5, and the water vapor driven off during the concentration is vented at vent line 19.

Figure 2:
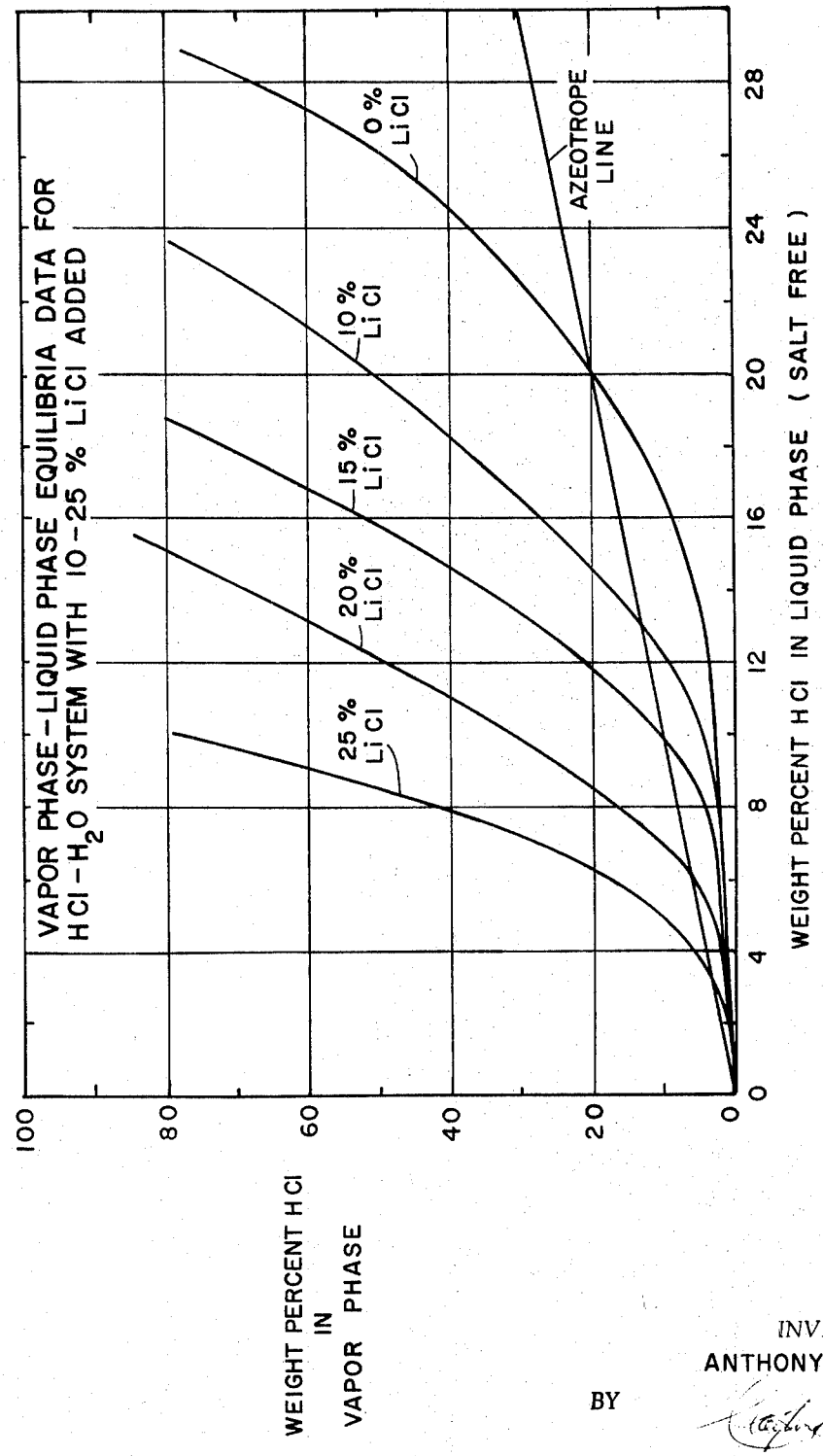
FIG. 2 of the drawings presents vapor phase-liquid phase equilibrium data for $HCl-H_2O$ systems with 10–25 percent by weight LiCl added.

Referring to FIG. 2 which presents the vapor-liquid equilibria for the $LiCl-HCl-H_2O$ system, it will be noted that the weight percent of HCl in the vapor phase is plotted against the weight percent of HCl in the liquid phase. These curves represent HCl solutions containing 0, 10, 15, 20 and 25 percent lithium chloride. The azeotrope line is also included on the chart, which intersects each liquid-vapor composition curve at the point where the weight percent of HCl in the liquid phase and the weight percent of HCl in the vapor phase are equal. As would be expected, the two-phase liquid-vapor composition curve wherein the liquid phase contains 0% LiCl, indicates the characteristic 20.2 wt. percent azeotrope normally obtained under standard conditions.

These data demonstrate a marked shift in the equilibrium relationship between the liquid-vapor phase as the percent LiCl present in the liquid phase is increased. It can be seen then, that LiCl can be used to shift the normal $HCl-H_2O$ azeotrope from 20.2 wt. percent to essentially 0% HCl.

From a theoretical standpoint, any concentration of hydrochloric acid over 20.2 percent can be rectified to approximately 100 percent hydrogen chloride and the 20.2 percent azeotrope, providing the HCl vapor is cooled sufficiently to condense the contained water as approximately 40 wt. % HCl. Where the concentration exceeds that of the azeotrope by a small amount, however, the yield of hydrogen chloride is very low, and the gas quite wet, requiring refrigeration or other means to provide the anhydrous product.

In a more practical sense, any vapor of over 50% HCl can be separated into essentially 100% HCl gas and an aqueous phase of about 40 percent hydrochloric acid. A concentration of lithium chloride of at least 30 percent by weight in the charge to the hydrogen chloride generator 5 would be required to provide a wet HCl vapor of at least about 50% HCl. There are, however, as previously pointed out, advantages in liberating a vapor closer to 100% HCl.

As shown in FIG. 2, as the concentration of lithium chloride in the HCl solution is increased, and the higher concentrations of hydrochloric acid are used as feed stock, an essentially dry gaseous HCl is obtained directly. An anhydrous HCl product can therefore be obtained without the need of refrigeration, and in better yield, since less water is present to be condensed as concentrated hydrochloric acid. Furthermore, the dry gaseous HCl is far less corrosive than the wet gas.

As a practical matter, therefore, the LiCl should be at least 30 wt. percent of the total generator charge, and preferably 40–55% LiCl on an anhydrous basis. Although a higher percentage of lithium chloride could be used, it would serve no useful purpose and would generally introduce operating problems as well as higher costs.

For best results, the hydrochloric acid feed to generator 5 should consist of at least a 20 percent solution. Correspondingly, the water returning with the LiCl should be minimal. Therefore, where the concentration of the acid to be dehydrated is dilute, it should first be concentrated to substantially the strength of the azeotrope by conventional means such as by distillation.

Figure 3:
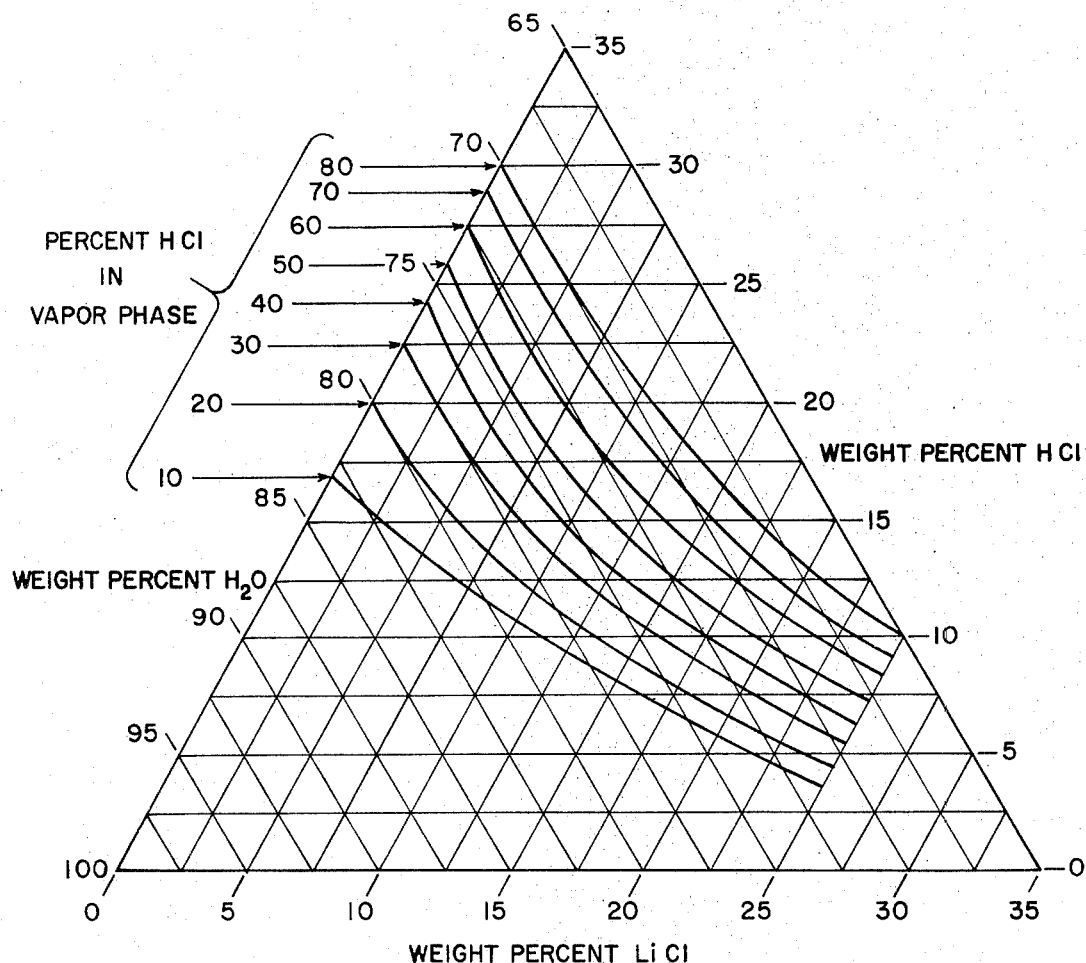
FIG. 3 of the drawings is an equilibrium diagram for $LiCl-HCl-H_2O$ solutions in equilibrium with hydrogen chloride.

Referring to FIG. 3, which gives hydrogen chloride-water vapor compositions in equilibrium with a boiling liquid phase containing lithium chloride, hydrochloric acid and water, it is apparent that incrementally introducing increasing amounts of lithium chloride to the hydrochloric acid feed will result in a corresponding increase in the percentage of HCl in the hydrogen chloride vapor and a corresponding reduction in the amount of HCl remaining in the "heel." (By the term "heel" or "bottoms" we mean the residual material remaining in a generator, still, or evaporator after a distillation, an evaporation or the generation of a gas has been completed.) There is a practical limit, however, to the amount of lithium chloride that can be added to the hydrochloric acid azeotrope fed to generator 5. For practical reasons, it is desirable that the lithium chloride be wholly in solution. Therefore, an amount of lithium chloride is used that will be in solution within the HCl generator 5, and will remain in solution in the flash evaporator for ease of handling. (Generally, an initial concentration of 50% LiCl in the generator will meet these requirements.) The solubility limits can be approximated from FIG. 4, which depicts the solubility of LiCl in water over a temperature range of 0° to 160° C. The curve is not smooth because of the effect on the ascending curve at those points where the hydrates lose water.

FIG. 5 depicts the boiling point curve for various concentrations of aqueous lithium chloride solutions.

The term "dehydration" has been used in foregoing portions of this specification. It is believed that dehydration is accomplished by lithium chloride, not by hydrate formation, as with the dehydrating agents of the prior art, but rather by hydration of the lithium ion itself when in solution.

DESCRIPTION OF THE PREFERRED EMBODIMENTS

The feed to generator 5 comprises 20 to 43 percent hydrochloric acid and lithium chloride (either as the solid anhydrous salt or as a solid hydrate), together with the comparatively small amounts of hydrochloric acid recovered from flash evaporator 3. Generator 5 which receives this charge is operable over the temperature range from about 20° to 135° C. The generator may also serve as a mixing vessel for the charge. Alternatively, a mixing stage may precede the generator. The generator 5 may consist of a simple, agitated, heated vessel or it may optionally be equipped with a stripping column, preceding the condenser, or it may be a flash evaporator arranged so that 20 to 43% HCl, preheated or at ambient temperature, is added to (or together with) solid lithium chloride either in the form of the anhydrous salt or as the monohydrate. If the generator is a flash evaporator, the preferred reaction temperature is 110°–135° C., while if a simple agitated vessel is used as a generator, the preferred temperature is 50 to 100° C.

The lithium chloride charge may represent at least about 30 wt percent of the total generator charge, and preferably about 40–55 percent on an anhydrous basis.

In the case of any of these variations, HCl vapor is evolved, and passes up through riser 7 to a reflux condensing system 9, which need only be water cooled to about 27° C. or below. 27° C. (80.6° F.) represents the approximate condensation temperature, below which we have found an HCl product of a high degree of dryness may be obtained (less than about 0.3 percent moisture), when said temperature is employed in connection with the present invention. Any condensate from the condensing system is returned through riser 7 and/or return line 11.

Essentially anhydrous hydrogen chloride product (99.7–100%) leaves the system through line 13.

The residual lithium chloride, which has picked up $H_2O$ from the dilute HCl, generally contains a small amount of HCl, and indeed, more efficient operation is obtained, particularly when running continuously, by not stripping to zero HCl but retaining a minor amount, generally a fraction of a percent HCl. To eliminate this, the residual lithium chloride passes to flash evaporator 3, but if the amount of HCl in the residue is not significant, as in batchwise operation, the "heel" or residue may go directly to concentrator 17 through line 15, and the flash evaporator 3 may be eliminated from the system. When the process is operated continuously, however, the flash evaporator is preferably employed to insure that the feed to the crystallizer-evaporator is free of HCl. This flash evaporator is maintained at between 100° to 170° C., preferably between 120° to 140° C. and the small amount of HCl stripped from the residual lithium chloride is recycled to generator 5. Following the stripping of the HCl from the lithium chloride in the flash evaporator 3, the charge is transferred to the lithium chloride concentrator 17. This unit is preferably a vacuum evaporator-crystallizer. The pressure in the evaporator is preferably reduced to a value which will give a boiling point of 40° to 80° C. The substantially HCl free aqueous lithium chloride solution is concentrated to obtain the monohydrate or the anhydrous salt of lithium chloride. Cooling may be employed but it is not required, particularly if the concentration of the LiCl has been carried to the composition of the monohydrate. The $LiCl \cdot H_2O$ or LiCl is withdrawn as a solid or as a slurry, separated from the mother liquor if any remains, and the $LiCl \cdot H_2O$ or LiCl solids, which may contain a small amount of occluded water, are recycled to generator 5. Any mother liquor is returned to evaporator-crystallizer 17. By adjusting the boiling point of the evaporator to a value above 98° C., anhydrous lithium chloride can be obtained, since 98° C. is the transition temperature between $LiCl \cdot H_2O$ and LiCl. Either the anhydrous salt or the hydrate can suitably be charged into generator 5. If desired, a two-stage vacuum-evaporator may be used. The water is vented at 19 and the solid anhydrous lithium chloride or the solid lithium chloride monohydrate, is recycled to generator 5. Yields of hydrogen chloride are essentially quantitative and the losses of LiCl are minimal.

Although the method of this disclosure relates primarily to the dehydration of hydrochloric acid, it will be seen from the following examples that it is also applicable to the dehydration of the azeotropes of hydrobromic acid (47.5% HBr) and hydriodic acid (57.5% HI). The method of the present invention may be applied to hydrobromic acid solutions having concentrations between about 47 to 69 wt. % HBr, and to hydriodic solutions having concentrations of between about 57 to 71 wt. % HI. The operating conditions indicated in the foregoing discussion are directed to essentially the most economical operation of the present invention, and are not to be construed as limiting in scope.

EXAMPLE 1

Referring again to FIG. 1, 100 parts of 20 percent hydrochloric acid feed stock are mixed with 280 parts of recycled lithium chloride monohydrate and 5 parts of recycled 40 percent hydrochloric acid. The mixture is then fed into a hydrogen chloride generator 5, at the rate of 3,850 lbs. per hour. The generator, which comprises a brick-lined packed tower with Karbate reboiler is maintained at approximately 90° C., and hydrogen chloride is evolved. This gas carrying a trace of moisture, passes into condenser system 9 wherein it is cooled to approximately 20° C. Much lower temperatures can be used if desired, but are unnecessary. The small amount of acidic water removed by the condenser drains back to generator 5, and the product gas consisting of essentially anhydrous hydrogen chloride (99.8%) leaves the system at line 17 at the rate of approximately 200 lbs./hr. 3,650 lbs. of solution per hour are drained from the generator, said solution comprising about 0.55% HCl and 52.0% LiCl. This solution is continuously charged, without cooling, to flash evaporator 3 which is maintained at about 130° C. At this temperature a quantity of about 50 lbs./hr. of 40% HCl solution is flashed off and recycled to generator 5. The aqueous heel from the flash evaporator 3 comprising essentially a 52 percent solution of lithium chloride is delivered to the vacuum evaporator-crystallizer represented at 17, at the rate of 3,600 lbs./hr. The lithium chloride crystallizes as the monohydrate at about 80°–98° C. 800 lbs./hr. of water vapor are vented to the atmosphere at 19 and the heel or residue consisting of about 2,800 lbs./hr. of LiCl (as damp crystals of the monohydrate), is conveyed via route 21 back to the generator. An essentially quantitative yield of 99.8 percent hydrogen chloride is obtained, and the lithium chloride make-up requirement is exceedingly small. The temperatures given are merely exemplary, and it will be obvious to those skilled in the art that some of these temperatures may vary when solutions of different compositions are used. The determination of the amount of such variation and the consequent adjustments of the procedures will be within the skill of those skilled in the art.

EXAMPLE 2

A mixture of 64 grams of 48 percent hydrobromic acid and 36.7 grams of anhydrous lithium bromide is gradually heated to 108° C. Hydrogen bromide is liberated. The remaining heel is found by analysis to contain 36.7 grams of lithium bromide, 3.6 grams of hydrogen bromide and 30.7 grams of water. By difference, it is found that 27.1 grams of hydrogen bromide and 2.6 grams of water have been vaporized, representing an aqueous hydrobromic acid strength of 91.2 percent.

EXAMPLE 3

A mixture of 77.2 grams of 43.5 percent hydrobromic acid and 38.5 grams of anhydrous lithium bromide is heated to 105° C. The remaining heel is found by analysis to contain 38.5 grams of lithium bromide, 6.0 grams of hydrogen bromide, and 37.3 grams of water. A material balance shows 33.9 grams of 81.4% HBr to have been vaporized.

EXAMPLE 4

A solution containing 49.2 grams of lithium iodide, 58.3 grams of hydriodic acid as HI and 45.1 grams of water is heated to 97° C. The remaining heel contains 49.2 grams of lithium iodide, 35.1 grams of HI and 41.4 grams of $H_2O$, thus 26.9 grams of $H_2O$ and HI are vaporized representing 26.9 grams of 86.3 percent hydriodic acid.

EXAMPLE 5

A solution containing 50.0 grams of lithium iodide, 58.3 grams of hydriodic acid as HI and 42.6 grams of water is heated to 102° C. The heel contains 50.0 grams LiI, 32.7 grams HI and 36.2 grams $H_2O$, thus 32.0 grams are vaporized representing 32.0 grams of an 80.0 percent hydriodic acid.

It is clear from the above examples that not only may lithium chloride be used to dehydrate hydrochloric acid solution when its concentration is substantially that of the azeotrope (20.24% HCl by weight), but that the corresponding lithium salts may be similarly employed to dehydrate hydrobromic acid (azeotrope contains 47.5% HBr), and hydriodic acid (azeotrope contains 57.5% HI)

In the case of Examples 2, 3, 4 and 5, no attempt was made to separate the moisture in the hydrogen halides by passing them through a condensing system. The product was determined by difference and by analysis of the heel or residue remaining, but experience has shown, as exemplified by Example 1, that a condensing system will readily remove the water in each instance as a strong aqueous solution of the hydrogen halide being produced, to permit the evolution of the hydrogen halide as a substantially anhydrous gas.

We claim:

1. A process for dehydrating aqueous solutions of hydrogen halide acids selected from the group consisting of hydrochloric acid, hydrobromic acid and hydriodic acid to obtain the corresponding essentially anhydrous hydrogen halide, comprising the steps of:
   a. mixing an aqueous solution of the said hydrogen halide acid having a concentration of at least about that of an azeotrope of the solution, with a solid lithium salt of said corresponding hydrogen halide; and
   b. heating said lithium salt/hydrogen halide acid aqueous mixture at a temperature within the range of 20° to 135° C. for a time sufficient to separate in gaseous form at least the major portion of the hydrogen halide component of said mixture from the lithium halide and water components thereof.

2. The process of claim 1, having as an additional step, the recovering of at least a portion of the lithium halide component of said mixture as a solid, and recycling said solid lithium halide as the solid lithium salt of step (a).

3. The process of claim 2 wherein said hydrogen halide component in gaseous form is cooled below about 27° C., thereby separating at least the major portion of any water vapor entrained therewith as aqueous hydrogen halide acid.

4. The process of claim 3 wherein said aqueous hydrogen halide acid is recycled.

5. The process of claim 2 wherein the hydrogen halide acid is hydrochloric acid, the lithium salt is lithium chloride, and the lithium chloride/hydrochloric acid aqueous mixture contains at least 30 wt percent lithium chloride.

6. The process of claim 2 wherein the hydrogen halide acid is hydrobromic acid, and the lithium salt is lithium bromide.

7. The process of claim 2 wherein the hydrogen halide acid is hydriodic acid, and the lithium salt is lithium iodide.

8. The process of claim 5 wherein the lithium chloride/hydrochloric acid mixture is maintained between 50° and 100° C.

9. The process of claim 5 wherein the lithium chloride/hydrochloric acid aqueous mixture contains 40–55 wt. percent lithium chloride.

10. The process of claim 5 wherein the lithium chloride/hydrochloric acid mixture is maintained between 110° and 135° C.

11. The process of claim 5 wherein the lithium chloride-water mixture remaining after the heating step is further heated to a temperature between about 100° and 170° C., thereby removing essentially all hydrogen chloride remaining therein.

12. The process of claim 11 wherein the lithium chloride-water mixture is rendered substantially anhydrous.

13. The process of claim 12 wherein the essentially HCl-free lithium chloride-water mixture is heated at a subatmospheric pressure such that the boiling point of said mixture ranges from about 40° C. to 80° C.

14. A process for dehydrating aqueous solutions of hydrogen halide acids selected from the group consisting of hydrochloric acid, hydrobromic acid, and hydriodic acid which comprises:
   a. maintaining a mixture of an aqueous solution of hydrogen halide acid and a lithium salt of said corresponding hydrogen halide at an elevated temperature to generate predominately gaseous hydrogen halide and minor amounts of water vapor,
   b. cooling said gaseous hydrogen halide and water vapor to condense the water vapor,
   c. returning the condensate to said mixture of aqueous solution of hydrogen halide and lithium salt,
   d. releasing said gaseous hydrogen halide,
   e. withdrawing the mixture of aqueous solution containing minor amounts of hydrogen halide and lithium halide and stripping therefrom substantially all the hydrogen halide leaving as bottoms, an aqueous solution of lithium halide,
   f. returning the evolved hydrogen halide to the mixture of aqueous solution of hydrogen halide and lithium halide,
   g. removing water from said bottoms and recycling the residual lithium halide to the mixture of aqueous solution of hydrogen halide and lithium halide; and
   h. introducing aqueous solution of hydrogen halide feed into the mixture of aqueous solution of hydrogen halide and lithium halide.

* * * * *